United States Patent [19]

Suzuki et al.

[11] Patent Number: 4,502,774

[45] Date of Patent: Mar. 5, 1985

[54] BATTERY CHECK DEVICE FOR CAMERA

[75] Inventors: Ryoichi Suzuki, Kanagawa; Ryuji Tokuda, Tokyo, both of Japan

[73] Assignee: Canon Kabushiki Kaisha, Tokyo, Japan

[21] Appl. No.: 501,987

[22] Filed: Jun. 7, 1983

[51] Int. Cl.³ .......................... G03B 7/26; G08B 21/00
[52] U.S. Cl. ..................................... 354/403; 354/468; 354/484; 340/663
[58] Field of Search ............... 354/403, 468, 484, 268, 354/83, 412; 340/663

[56] References Cited

U.S. PATENT DOCUMENTS

| 3,840,296 | 10/1974 | Ho et al. | 354/468 X |
| 4,181,414 | 1/1980 | Ito et al. | 354/83 |
| 4,350,418 | 9/1982 | Taguchi et al. | 354/468 X |
| 4,370,037 | 1/1983 | Uchidoi et al. | 354/468 X |

Primary Examiner—William B. Perkey
Attorney, Agent, or Firm—Toren, McGeady and Stanger

[57] ABSTRACT

To accurately check a battery of a camera, a battery checking operation must be performed under maximum load current, namely, the load current of a shutter release magnet or the like. The invention avoids the effect of a current through the magnet triggering a photographic operation of the camera during a battery check by having currents flow to a plurality of selected loads of the camera, such as light emitting diodes, etc., instead of through the magnet. The plurality of loads are preselected to draw the total sum of load currents nearly equal to the maximum load current. A battery check can be performed without applying a drive current to the largest load and yet the accuracy of the battery check thus obtained equals that of the accuracy obtainable with the largest load.

9 Claims, 3 Drawing Figures

BATTERY CHECK DEVICE FOR CAMERA

BACKGROUND OF THE INVENTION

1. Field of the Invention

This invention relates to a method for carrying out power source voltage check for a camera which is suited particularly for a lens shutter type camera. The term "power source voltage check" as used herein for the purpose of this invention includes two modes of action, one being to make display only when the power source voltage drops below a prescribed value and the other to inhibit the photo-taking operation of the camera under such a condition.

2. Description of the Prior Art

In checking the voltage of a power source, the conventional cameras have been arranged to ensure the accuracy of the power source voltage check by allowing either the real maximum load current of the camera or an imitative load current which corresponds to the maximum load current to flow. In other words, they are arranged to accurately check a power source voltage with the flow of the maximum load current without being affected by the characteristic of the power source battery which tends to fluctuate with the current value. Meanwhile, the power source voltage check is preferably performed when the power source has become stable after a power supply switch is turned on and before commencement of a sequence of photographing actions because the sequence of photographing actions should be inhibited to prevent the camera from performing an erroneous action when the power source battery is defective.

In most cases, the maximum load current is required by a starting magnet or a shutter controlling magnet. When a current is allowed to flow to such a magnet for the purpose of checking the power source voltage, the sequence of photographing actions would begin and shutter release might be effected if there is provided no mechanical restriction arrangement in the camera.

To prevent such erroneous actions, therefore, a mechanical restriction mechanism is often arranged to prevent the action of the armature of a magnet before a shutter release operation of the camera. However, the provision of such a mechanism not only complicates the structural arrangement of the camera, thus resulting in an increased cost of manufacture, but also presents great difficulty in arranging it within a severely limited space available in a lens shutter camera.

Meanwhile, the above-stated conventional method of having a current flow to a discrete imitative load arrangement corresponding to the maximum or largest load of the camera, it is difficult to consume within an IC arrangement the current which corresponds to the maximum load current. It is conceivable to avoid that difficulty by connecting an external element for imitative load control to a pin of an IC discretely provided for that purpose. However, such an alternative is disadvantageous in terms of actual electrical arrangements and also with respect to increase in cost of the product.

SUMMARY OF THE INVENTION

It is an object of the invention to provide a method for accomplishing power source voltage check for a camera which permits accurate check for the voltage of a power source without affecting the photographing operation of the camera and without causing any increase in cost to solve the above-stated problems confronted with by the methods of the prior art.

To attain this object, the present method has features in an arrangement wherein a plurality of loads, the total sum of the load currents of which corresponds to the maximum load current, is preselected from such electrical loads that remain in a state of not triggering the photographing operation of the camera when the current flows thereto; and the current is arranged to simultaneously flow to these preselected loads at the time of power source voltage check.

It is another object of the invention to provide a camera wherein, when power source voltage check is to be made with a driving current applied to a mechanism driving magnet which is arranged to drive a shutter release mechanism or the like of the camera, a current which is smaller than the driving current is applied to the magnet while another current is applied to a light emitting element of a focusing device in such a manner as to imitatively create a state of having a driving current applied to the magnet, so that a power source battery checking operation can be accomplished under a maximum load condition.

These and further objects and features of the invention will become apparent from the following detailed description of preferred embodiments thereof taken in conjunction with the accompanying drawings:

DETAILED DESCRIPTION OF THE PREFERRED EMBODIMENTS

Figure 1:
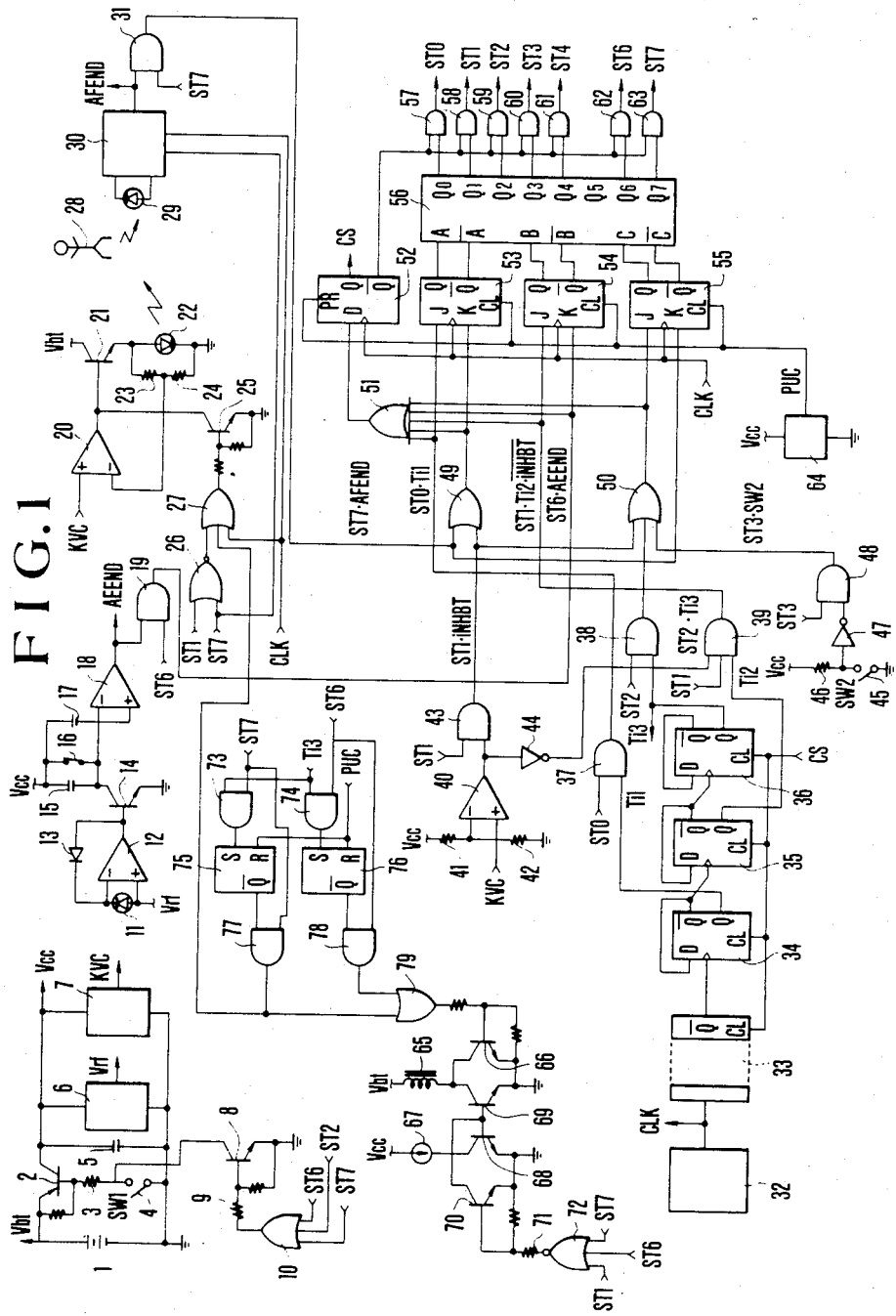
FIG. 1 is a circuit diagram showing an embodiment of the present invention.
Figure 2:
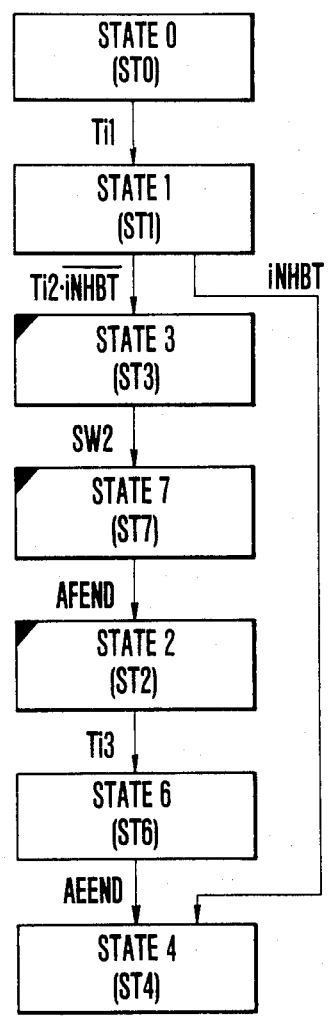
FIG. 2 is a flow chart showing a transitional flow from one state to another of the same embodiment.

An embodiment example of the present invention is as shown in a circuit diagram in FIG. 1 and in a flow chart in FIG. 2. In this specific embodiment, an infrared ray emitting diode included in an active type automatic focusing device and an attracting-and-holding type magnet which is provided for controlling a lens barrel and a shutter are selected as loads to be used for power source voltage check.

Referring first to FIG. 2, state signals ST0, ST1, ST2, ST3, ST4, ST6 and ST7 (not including a state signal ST5) are arranged to be produced respectively under states 0, 1, 2, 3, 4, 6 and 7 (excluding a state 5). The state 0 represents a period after a power source switch is turned on and before stabilization of the power source. The state 0 is arranged to be changed to the state 1 by a time signal Ti1. Power source voltage check is carried out under the state 1. The state 1 is changed to the state 3 by a time signal Ti2. A shutter release signal SW2 is held in abeyance under the state 3 until it causes the state 3 to change to the state 7. An automatic focal point control action is performed under the state 7. When an in-focus signal AFEND is produced, the state 7 changes to the state 2 which is an interval period. The state 2 continues until commencement of shutter opening. Upon commencement of shutter opening, the state 2 is changed to the state 6 by a time signal Ti3. In the state 6, the shutter opening is carried out in accordance with a shutter time determined by automatic exposure control. The state 6 is changed to the state 4 by an exposure completion signal AEEND and the shutter is closed to complete one cycle of sequence of photographing actions. Under the state 1, if the power source voltage is lower than a specific value, an inhibition signal iNHBT is produced and the state 1 is immediately changed to the state 4. In other words, if the inhibition signal iNHBT is not produced during the power source voltage check under the state 1, normal photographing actions are performed. However, if the inhibition signal iNHBT is produced, the state 1 changes to the state 4 to inhibit the photographing actions, so that an erroneous action due to a drop of the power source voltage can be prevented.

Referring now to FIG. 1, the embodiment includes a power source battery 1; a power source latching transistor 2; a resistor 3; a power source switch 4 which is arranged to turn on in response to the first stroke of a shutter release button and to produce a power source switched-on signal SW1 of a low level; a capacitor 5 for coupling the power source; a circuit 6 which is arranged to produce a reference voltage Vrf; a circuit 7 which is arranged to produce a constant voltage KVC; a switching transistor 8 which is parallel connected to the power source switch 4; a resistor 9; an OR gate 10; a photo-galvanic element 11; an operational amplifier 12; a diode 13 which is connected to the negative feedback line of the operational amplifier 12 for anti-logarithmic suppression; a transistor 14 for logarithmic expansion; a capacitor 15 for a time constant; a count start switch 16 which is arranged to turn off in response to commencement of a shutter action; a constant voltage source 17; a comparator 18 which is arranged to produce an exposure completion signal AEEND; and an AND gate 19.

The embodiment further includes an operational amplifier 20 which forms a constant voltage circuit and is arranged to apply the constant voltage KVC to the non-inversion input terminal thereof; a transistor 21 which is arranged to drive an infrared ray emitting diode 22; resistors 23 and 24; a transistor 25; and a NOR gate 26; an OR gate 27. A reference numeral 28 indicates an object to be photographed. There are further provided a light measurement element 29 for automatic focusing; a known automatic focal point control circuit 30 which computes and processes the output of the light measurement element 29 and is arranged to produce an in-focus signal AFEND; and an AND gate 31.

The embodiment is provided with an oscillating circuit 32 which produces clock pulses CLK; a frequency dividing circuit 33; D flip-flops 34-36 which are arranged to produce the time signals Ti1-Ti3; AND gates 37-39; a comparator 40 which is provided for checking power source voltage and is arranged to supply the constant voltage KVC to its non-inversion input terminal and to apply also a divided voltage of the power source voltage VCC which is obtained via voltage dividing resistors 41 and 42 to the inversion input terminal thereof; an AND gate 43; an inverter 44; a release switch 45 which is arranged to turn on in response to the second stroke of the shutter release button and to produce a release signal SW2 of a low level when it turns on; a resistor 46; an inverter 47; an AND gate 48; OR gates 49-51; a D flip-flop 52 which is arranged to produce from its output terminal Q a clear signal CS and supplies this signal to the clear circuits CL of the frequency dividing circuit 33 and D flip-flops 34-36; JK flip-flops 53-55 which are arranged to produce the state signals ST0-ST7; a decoder 56 which converts the binary outputs of the JK flip-flops into a decimal code; AND gates 57-63 which are connected to the output terminals Q0-Q7 of the decoder 56 and are arranged to produce the state signals ST0-ST7; and a single pulse generating circuit 64 which produces a power up clear signal PUC when the power source switch is turned on and is arranged to preset the D flip-flop 52 and to clear the JK flip-flops 53-55.

A magnet 65 is provided for the purpose of controlling a lens barrel and the shutter. A transistor 66 is arranged to have an attraction current supplied to the magnet 65 by a battery voltage Vbt when it turns on. A numeral 67 indicates a constant current source; 68 and 69 indicate transistors arranged to supply the magnet 65 with a holding current and to form a current mirror; 70 indicates a switching transistor; 71 indicates a resistor; 72 indicates a NOR gate; 73 and 74 indicate AND gates; 75 and 76 indicate RS flip-flops; 77 and 78 indicate AND gates; and 79 indicates an OR gate.

The embodiment operates in the following manner: First, the power source switch 4 turns on when the shutter release button is operated to the first position of its stroke thereof. The power source latching transistor 2 then turns on to have the power source voltage VCC supplied to each applicable part. The single pulse generating circuit 64 produces the power up clear signal PUC to preset the D flip-flop 52 and to clear the JK flip-flops 53-55. With the D flip-flop 52 preset, it supplies a clear signal CS to the frequency dividing circuit 33 and the clear terminals CL of the D flip-flops 34-36 to clear them. The output level of the output terminal $\bar{Q}$ of the D flip-flop 52 becomes low to close all the AND gates 57-63. Therefore, the state signals ST0-ST7 are not produced. With the JK flip-flops 53-55 cleared, the decoder 56 produces a high level signal solely from the output terminal Q0 among other output terminals thereof.

With none of the state signals ST0-ST7 produced, all the inputs of the OR gate 51 are at low levels. Therefore, a rise of a next clock pulse CLK causes the output of the output terminal $\bar{Q}$ of the D flip-flop 52 to change to a high level. As a result of this, the AND gates 57-63 are opened. The high level output of the output terminal Q0 of the decoder 56 is then comes through the AND gate 57 and is produced as the state signal ST0. There obtains the state 0 accordingly.

The frequency dividing circuit 33 and the D flip-flops 34-36 begin a counting action when the clear signal CS disappears. When the output terminal Q of the D flip-flop 34 produces the time signal Ti1 of a high level, the AND gate 37 supplies a high level signal to the input terminal J of the JK flip-flop 53 and to the OR gate 51. Following that, a rise of a next clock pulse CLK causes the output level of the output terminal Q of the JK flip-flop 53 to become high. This in turn makes the output level of the output terminal Q1 of the decoder 56 high. Concurrently with this, the output level of the OR gate 51 becomes high to make the output level of the output terminal $\bar{Q}$ of the D flip-flop 52 low. The low level output of the output terminal $\bar{Q}$ causes the AND gates 57-63 to close. Therefore, the state signal ST1 is still not produced. When the frequency dividing circuit 33 and the D flip-flops 34-36 are cleared by the clear signal CS of the output terminal Q of the D flip-flop 52, the output level of the OR gate 51 changes to a low level. The D flip-flop 52 is reset by the rise of a next clock pulse CLK. The AND gate 58 then produces the state signal ST1 to change the state 0 to the state 1.

A checking action for the power source voltage VCC is performed under the state 1. With the state signal ST1 supplied, the output level of the NOR gate 72 changes to a low level to turn off the switching transistor 70. As a result of this, the transistors 68 and 69 which form a current mirror cause the current of the constant current source 67 to flow to the magnet 65. This current is set at such a value that does not cause the magnet 65 to attract the armature. Therefore, the current never causes the camera to begin a photographing operation.

Meanwhile, at the same time as this, the state signal ST1 comes to change the output level of the NOR gate 26 to a low level. Therefore, the clock pulse CLK is supplied to the base of the transistor 25 through the OR gate 27. The transistors 25 and 21 then repeatedly turn on and off to cause the infrared ray emitting diode 22 to flicker. Then, the lighting voltage for the diode is kept unvarying by the negative feedback action of the operational amplifier 20.

The sum of the holding current of the magnet 65 and the flickering current of the infrared ray emitting diode 22 is exactly or approximately the same as the maximum load current of the camera. Accordingly, with these currents allowed to simultaneously flow, there obtains the same state as when a current flows to the largest load of the camera. If the power source battery 1 has not been much consumed at that time and the power source voltage VCC is above a specific value, the output level of the comparator 40 is low. The output level of the AND gate 43, therefore, becomes low and that of the inverter 44 high. When a predetermined length of time elapses after the state 1 is obtained, that is, when the D flip-flop 35 produces the time signal Ti2, the output level of the AND gate 39 changes to a high level. Therefore, the rise of a next clock pulse CLK causes the output level of the output terminal Q of the JK flip-flop 54 to become high. Then, the levels of inputs to both the input terminals A and B of the decoder 56 become high to make the output level of the output terminal Q3 of the decoder 56 high. Consequently, in the same manner as in the case of the state signal ST1, the rise of a next clock pulse CLK causes AND gate 60 to produce the state signal ST3 and the state 3 obtains there. In this instance, the frequency dividing circuit 33 and the D flip-flops 34–36 are also cleared for once.

After the shift to the state 3, when the release switch 45 is turned on by a shutter release operation to produce the release signal SW2 of a low level, the AND gate 48 produces a high level signal. With the high level signal produced from the AND gate 48, the rise of a next clock pulse CLK changes the output level of the output terminal Q of the JK flip-flop 55 to a high level. Accordingly, the output level of the output terminal Q7 of the decoder 56 becomes high. Therefore, the rise of a next clock pulse CLK causes the AND gate 63 to produce the state signal ST7 to effect a shift from the state 3 to the state 7. The frequency dividing circuit 33 and the D flip-flops 34–36 are cleared for once also in this instance.

Since the RS flip-flop 75 has been reset to its initial state by the power up clear signal PUC, the output of the output terminal $\overline{Q}$ thereof is at a high level. The AND gate 77, therefore, produces a high level signal to turn on the transistor 66 and thus to have an attraction current flow to the magnet 65. The attraction current is greater than the current of the constant current source 67 mentioned in the foregoing. The armature is therefore attracted to cause the lens barrel of the camera to begin to shift its position through a mechanism which is not shown. While the attraction current is flowing to the magnet 65, the high level output of the AND gate 77 turns on the transistor 25 through the OR gate 27 and turns off the transistor 21. Therefore, the infrared ray emitting diode 22 never flickers as long as the attraction current is flowing to the magnet. Since the period during which the attraction current is allowed to flow to the magnet 65 is set at the shortest possible length of time for enabling the magnet 65 to attract the armature, the inhibition of the infrared ray emitting diode 22 from flickering during this short period does not affect an automatic focal point controlling action (or focusing action) of the camera.

Under the state 7, when the time signal Ti3 is produced from the output terminal Q of the D flip-flop 36, the output level of the AND gate 73 changes to a high level to set the RS flip-flop 75 and to make the output level of the AND gate 77 low. With the output level of the AND gate 77 becoming low, the transistor 66 turns off to cut off the attraction current flow to the magnet 65. In the meantime, however, the switching transistor 70 is turned off by the state signal ST7. Therefore, the current of the constant current source 67 flows to the magnet 65 via the transistors 68 and 69 to keep it excited. With the output level of the AND gate 77 becoming low, the clock pulse CLK comes to the base of the transistor 25 to cause the transistor 21 to repeatedly turn on and off. The infrared ray emitting diode 22 therefore flickers. A light produced from the infrared emitting diode 22 is reflected by the object 28 to be photographed. The reflected light comes to the light measurement element 29. The automatic focusing circuit 30 moves the lens barrel to bring the lens into an in-focus position according to the incident light thus obtained. An in-focus signal AFEND is produced when the lens is brought into the in-focus position. This signal AFEND causes the output level of the AND gate 31 to become high. The high level output of the AND gate 31 comes to the input terminal K of the JK flip-flop 53 via the input terminal K of the JK flip-flop 55 and the OR gate 49. Following this, the rise of a next clock pulse CLK changes the output levels of the output terminals Q of the JK flip-flops 53 and 55 to low levels. Then, the output level of the output terminal Q2 of the decoder 56 becomes high. Accordingly, the rise of an ensuring clock pulse CLK causes the state signal ST2 to be produced from the AND gate 59. There obtains the state 2. When the state signal ST7 disappears, the output level of the NOR gate 72 becomes high to turn on the switching transistor 70. With the switching transistor turned on, the transistor 68 turns off to cut off the holding current to the magnet 65. Consequently, the lens barrel is inhibited from moving.

When a predetermined length of time elapses after the shift to the state 2 and the time signal Ti3 is produced from the D flip-flop 36, the output level of the AND gate 38 changes to a high level to set the JK flip-flop 55. Therefore, the output level of the output terminal Q6 of the decoder 56 becomes high to cause the state signal ST6 to be produced from the AND gate 62. The state 2 shifts to the state 6.

The AND gate 78 is caused to produce a high level signal by the high level output of the output terminal $\overline{Q}$ of the RS flip-flop 76 and the state signal ST6. The high level signal from the AND gate 78 turns the transistor 66 on to have an attraction current flow to the magnet 65. This causes the armature to be attracted. In response to this, a mechanism which is not shown initiates a shutter opening action. After the lapse of a predetermined length of time under the state 6, the time signal Ti3 is produced from the D flip-flop 36. With the time signal Ti3 thus produced, the AND gate 74 sets the RS flip-flop 76 and make the output level of the AND gate 78 low. As a result of that, the attraction current to the magnet 65 is cut off and is replaced with a holding current.

The count initiating switch 16 turns off when the shutter opening action begins. As a result of that, the time constant capacitor 15 is charged with the expanding current of the anti-logarithmic expansion transistor 14. When the charge voltage of the capacitor 15 reaches a prescribed value, the comparator 18 produces an exposure completion signal AEEND of a high level. Consequently, the output level of the AND gate 19 changes to a high level to reset the JK flip-flop 54. With the flip-flop 54 reset, the output level of the output terminal Q4 of the decoder 56 becomes high to cause the AND gate 61 to produce the state signal ST4 and the state 6 shifts to the state 4.

The disappearance of the state signal ST6 results in a high output level of the NOR gate 72. The switching transistor 70 then turns on to cut off the holding current flow to the magnet 65 and thus to close the shutter. With the shutter closed, the sequence of photographing actions comes to an end.

In cases where the power source battery has been much consumed and thus the holding current to the magnet 65 and the flickering current to the infrared ray emitting diode 22 causes the power source voltage VCC to become lower than the predetermined voltage under the state 1, the comparator 40 comes to produce an inhibition signal iNHBT of a high level. Accordingly, the output level of the AND gate 43 then changes to a high level to reset the JK flip-flop 53 through the OR gates 49 and 50 and also to set the JK flip-flop 55. This causes the output level of the output terminal Q4 of the decoder 56 to become a high level and the state signal ST4 is produced. In other words, the state 1 shifts immediately to the state 4 and no photographing action is performed.

Figure 3:
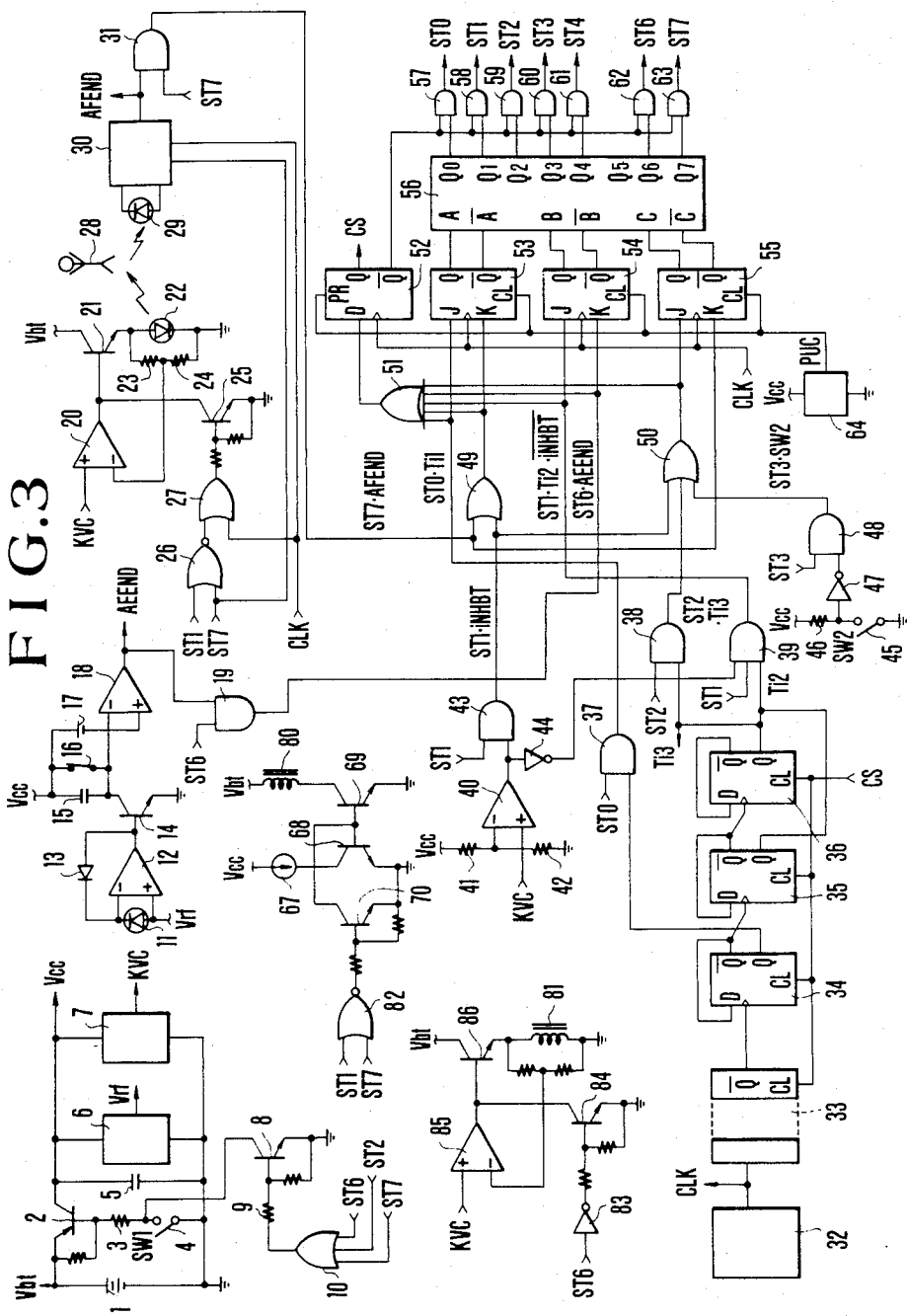
FIG. 3 is a circuit diagram showing another embodiment of the invention.

Another embodiment of the invention is as shown in FIG. 3. In this case, a magnet 80 for controlling the lens barrel and a coil 81 for shutter control are separately arranged. As to the loads to which currents are to be applied for the power source voltage check, the magnet 80 and an infrared ray emitting diode 22 are selected for that purpose. In FIG. 3, the parts which are similar to those shown in FIG. 1 are indicated by the same reference numerals and symbols. Further, this particular embodiment is of the type called the electromagnetically operated shutter type in which the shutter member is arranged to be driven by an electromagnetic force obtained by having a current flow to a coil 81 at the time of driving the shutter. The embodiment operates in almost the same manner as the preceding example of embodiment shown in FIG. 1. Therefore, the following description covers only the portion of operation in which the embodiment differs from the other embodiment shown in FIG. 1. At the time of power source voltage check in the state 1, the state signal ST1 causes the output level of the NOR gate 82 to become a low level. The low level output of the gate 82 turns off the switching transistor 70 to cause the current of the constant current source 67 to flow to the magnet 80 through the transistors 68 and 69 which form a current mirror. Concurrently with that, a flickering current flows to the infrared ray emitting diode 22 in the same manner as in the case of FIG. 1. The sum of these currents corresponds to the maximum load current, which is a load current for the coil 81 in the case of this embodiment. The magnet 80 is of the holding type and, in this particular embodiment, the lens barrel is arranged to be movable by means of a mechanical release member. The power supply to the magnet 80 never causes the lens barrel to move except that the power supply is effected during an automatic focusing action.

When the state 7 is brought about by a release operation, power supply to the magnet 80 is effected. Then, the lens barrel is unlocked by the release member and is allowed to move. When the in-focus signal AFEND is produced, the power supply to the magnet 80 is cut off to inhibit the lens barrel from moving.

After the embodiment is shifted to the state 6 and the state signal ST6 is produced, the output level of an inverter 83 becomes a low level to turn off a transistor 84. This causes a constant voltage which is controlled by an operational amplifier 85 to be impressed via transistor 86 on the coil 81 of electromagnetic driving means such as a motor. The shutter member is opened by an electromagnetic force produced by the coil 81 and an exposure begins. Upon completion of the exposure, an exposure completion signal AEEND comes to cut off the power supply to the coil 81. The shutter is then closed by the force of a spring.

The plurality of loads to be selected in accordance with the invention are not limited to those employed in the specific embodiments illustrated in the accompanying drawings. They can be selected according to varied specifications of cameras. It is also possible to superpose on each other some loads that are arranged not to concurrently have power supply thereto during a normal sequence of photographing actions. Further, the maximum or largest load is not limited to the load related to the automatic focusing control or the automatic exposure control but a load relative to an electronic flash device or an automatic winding drive device may be used for the maximum load current.

The present invention is applicable not only to a lens shutter type camera but also to a single-lens reflex camera. The specific examples of embodiment described in the foregoing use an automatic focusing device of the active type in which automatic focusing is accomplished by having a reference light projected from a light emitting diode onto an object to be photographed and by detecting a distance to the object through the medium of a reflection light coming from the object as a result of the projection of the reference light. However, the invention is applicable not only to the active type but also to a camera using a focusing device of the passive type. In the latter case, an illumination light source which is arranged to illuminate the object to assist a distance measuring action must be used as the load to which a current is to be applied for power source battery check. Further, the loads to which currents are to be applied at the time of battery check may be selected from various parts including a display circuit, a sound emitting device such as a buzzer, etc.

In cases where the invention is to be applied to a single-lens reflex camera, the battery check may be accomplished by supplying currents to a magnet provided for a trailing shutter curtain and a display circuit in such a manner as to imitatively obtain a maximum load current which is obtainable by effecting power supply to a magnet provided for shutter action.

In accordance with the present invention, as apparent from the foregoing description, a plurality of loads the total sum of the load currents of which corresponds to a maximum load current of the camera are preselected out of such electrical loads that are in positions not to trigger a photographing operation of the camera when currents are allowed to flow thereto; and, at the time of power source voltage check, currents are simultaneously allowed to flow to the preselected loads. Therefore, the power source voltage check can be accurately accomplished without affecting the photographing operation and without causing any increase in cost of the camera.

What we claim:

1. A camera comprising:
   (a) a plurality of electrical loads including an electrical load for driving a photographic operation control mechanism of the camera;
   (b) a voltage check circuit arranged to detect a power source voltage; and
   (c) a driving circuit for supplying currents to at least two preselected electrical loads including said electrical load for driving a photographing operation control mechanism, said driving circuit being arranged for supplying a current which is smaller than a current required for driving a photographing operation control mechanism to said load for driving said mechanism; and
   (d) a control circuit arranged to actuate said driving circuit when a battery check operation is to be performed by said voltage check circuit.

2. A camera comprising:
   (a) a plurality of electrical loads including an electrical load required for driving a photographing operation control mechanism of the camera;
   (b) a voltage check circuit arranged to detect a power source voltage; and
   (c) a drive circuit arranged to supply currents to at least two preselected electrical loads which are preselected out of said electrical loads in such a manner that the total sum of load currents for the preselected loads corresponds to a maximum load current of the camera; and
   (d) a control circuit arranged to actuate said drive circuit when a battery check operation is to be performed by said voltage check circuit.

3. A camera comprising:
   (a) a plurality of electrical loads including the largest electrical load which is arranged for driving a photographing operation control mechanism of the camera;
   (b) a voltage check circuit arranged to detect a power source voltage; and
   (c) a drive circuit arranged to supply currents to at least two preselected electrical loads which are preselected out of said electrical loads in such a manner that the total sum of load currents for the preselected loads corresponds to a driving current required for driving said largest electrical load; and
   (d) a control circuit arranged to actuate said drive circuit when a battery check operation is to be performed by said voltage check circuit.

4. A camera comprising:
   (a) a magnet functionally coupled to a photographing operation control mechanism of the camera, said magnet being arranged to actuate said mechansim when a driving current is supplied thereto;
   (b) an electrical load not coupled to the photographing operation control mechanism of the camera;
   (c) a power supply circuit arranged to supply said magnet with a current which is smaller than said driving current required for actuating said mechanism and also to supply said electrical load with a current;
   (d) a photographing operation control circuit arranged to supply said driving current to said magnet and said electrical load at predetermined timing for a photographing operation;
   (e) a voltage check circuit for checking a power source voltage; and
   (f) a battery check control circuit arranged to actuate said power supply circuit when a battery checking operation is to be performed with said voltage check circuit.

5. A camera according to claim 4, wherein said electrical load is light emitting means.

6. A camera according to claim 5, wherein said light emitting means is arranged to project a light onto an object to be photographed for the purpose of automatic focusing.

7. A camera comprising:
   (a) a plurality of electrical loads including the largest electrical load which is arranged to drive a photographing operation control mechanism of the camera when a driving current is supplied thereto;
   (b) a voltage check circuit arranged to detect a power source voltage;
   (c) a drive circuit arranged to supply currents to at least two electrical loads including said largest electrical load, said current supplied to the largest electrical load by said drive circuit being arranged to be of a value smaller than said driving current required for driving said mechanism;
   (d) a photographing operation control circuit which, at the time of a photographing operation, supplies a driving current at predetermined timing to each of said electrical loads to allow them to perform the photographing operation; and
   (e) a battery check control circuit arranged to actuate said drive circuit when battery check is to be performed through said voltage check circuit.

8. A camera according to claim 7, wherein the total sum value of the currents supplied from said drive circuit to said loads corresponds to a maximum load current of the camera.

9. A camera comprising:
   (a) a plurality of electrical loads including an electrical load required for driving a photographic operation control mechanism of the camera;
   (b) a voltage check circuit arranged to detect a power source voltage;
   (c) a driving circuit arranged to supply currents to at least two preselected electrical loads which are preselected out of said electrical loads such that the total sum of load currents for the preselected loads is substantially the same as a maximum load current of the camera;
   (d) a control circuit for actuating said drive circuit when a battery check operation is to be performed by said voltage check circuit.

* * * * *

UNITED STATES PATENT AND TRADEMARK OFFICE
CERTIFICATE OF CORRECTION

PATENT NO. : 4,502,774
DATED : March 5, 1985
INVENTOR(S) : Ryoichi Suzuki, et al It is certified that error appears in the above-identified patent and that said Letters Patent is hereby corrected as shown below:

On the title page, Item /30/ it should read:

[30] Foreign Application Priority Data

June 15, 1983 [JP]   Japan ......... 57-102770

Signed and Sealed this

Fifth Day of November 1985

[SEAL]

Attest:

DONALD J. QUIGG

Attesting Officer

Commissioner of Patents and Trademarks